Figure 1:
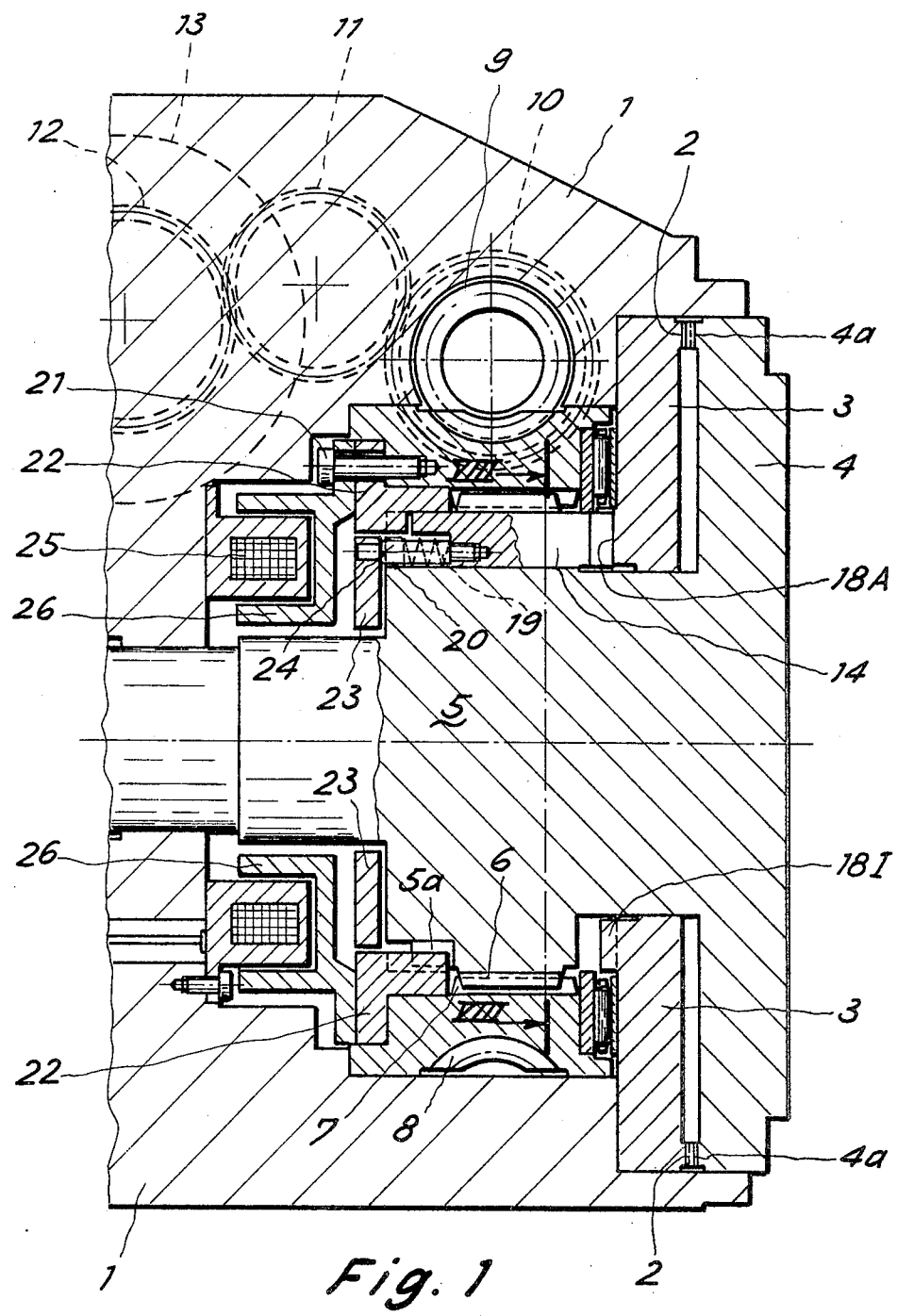

United States Patent [19]

Boffelli

[11] 4,422,352
[45] Dec. 27, 1983

[54] APPARATUS FOR ROTATING IN EITHER DIRECTION A TURRET THAT CARRIES PLURAL TOOL HOLDERS

[75] Inventor: Pier C. Boffelli, Milan, Italy
[73] Assignee: Baruffaldi Frizioni S.p.A., Milan, Italy
[21] Appl. No.: 313,187
[22] Filed: Oct. 20, 1981
[30] Foreign Application Priority Data Oct. 23, 1980 [IT] Italy .................. 25537 A/80

[51] Int. Cl.³ ............................................ B23B 29/24
[52] U.S. Cl. .................................. 74/813 L; 74/826; 74/818; 74/822
[58] Field of Search ..................... 74/826, 822, 813 C, 74/813 L, 817, 818

[56] References Cited

U.S. PATENT DOCUMENTS

| 3,718,055 | 2/1973 | Maier | 74/826 |
| 3,797,333 | 3/1974 | Maier | 74/826 |
| 4,184,691 | 1/1980 | Esser et al. | 74/826 |
| 4,202,227 | 5/1980 | Thumm | 74/826 |

*Primary Examiner*—Kenneth J. Dorner
*Assistant Examiner*—Anthony W. Raskob, Jr.
*Attorney, Agent, or Firm*—Young & Thompson

[57] ABSTRACT

A rotatable turret for bringing any selected one of a plurality of tool holders into operative position relative to a workpiece, is characterized in that the turret can be rotated in either direction so that it need follow only the shortest path between the location of the old tool holder and the location of the new tool holder when changing from tool to tool. For this purpose, the turret has a rotatable hub with a plurality of blocks on its periphery slidable relative thereto in directions parallel to the axis of rotation, into and out of slots on a fixed member, the location of the slots corresponding to the operative locations of the tool holders. The blocks are all secured to the keeper ring of an annular electromagnet, whose strength is sufficient to retain the keeper ring attracted when the blocks are out of the slots, but whose strength is insufficient to retain the keeper ring when the blocks are in the slots. Springs act between the hub and the blocks to urge the blocks into the slots; and cam surfaces on the fixed member cam the blocks out of the slots against the action of the springs in one direction of rotation of the hub. A driving ring for the hub has abutment surfaces that contact the hub only in that one direction of rotation; whereas the same driving ring has abutment surfaces that contact only the blocks in the other direction of rotation, and then only when the blocks are withdrawn from the slots.

5 Claims, 8 Drawing Figures

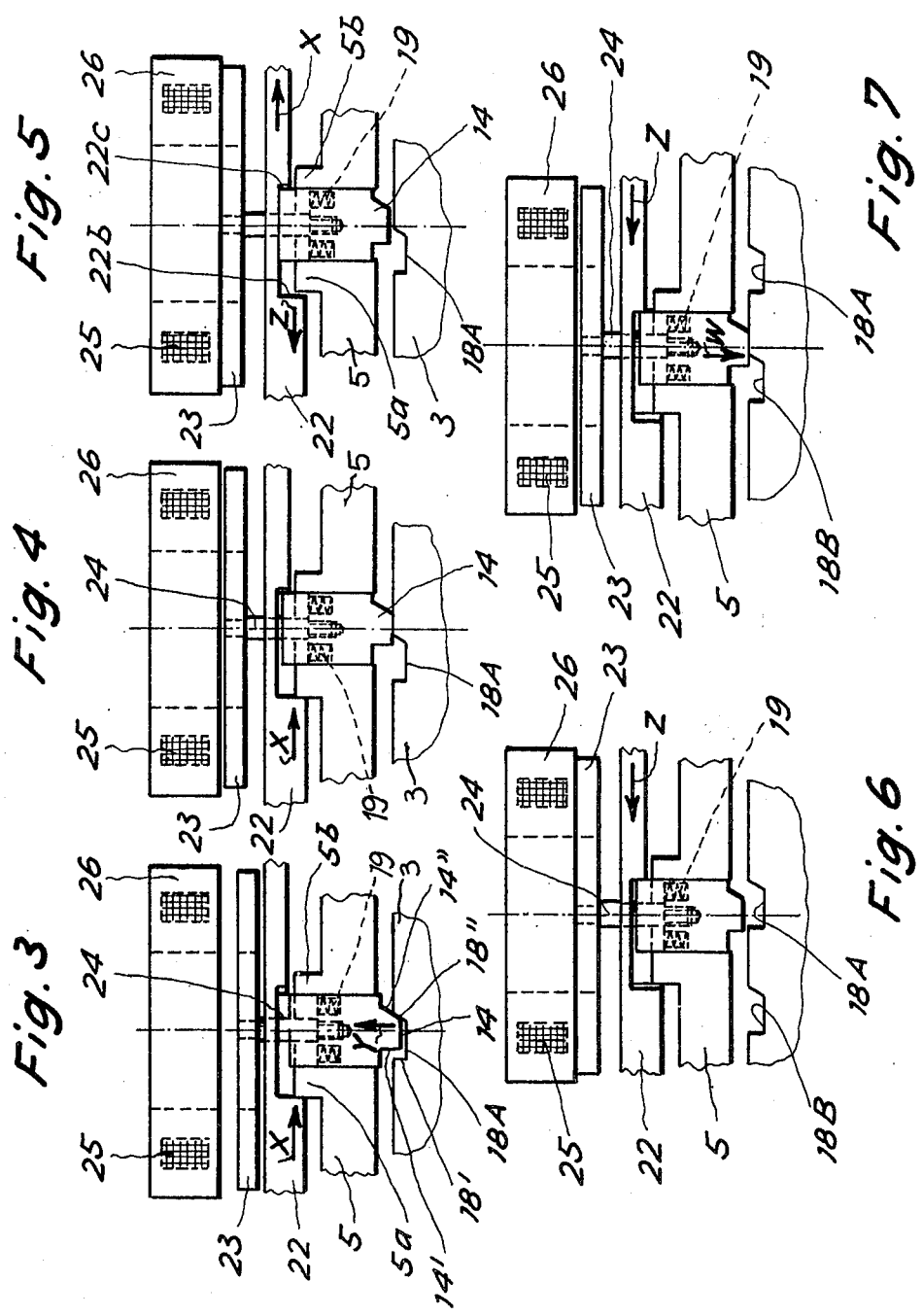

APPARATUS FOR ROTATING IN EITHER DIRECTION A TURRET THAT CARRIES PLURAL TOOL HOLDERS

The present invention is a device for positioning the tool post body in turret tool posts of the automatic type for lathes or similar machines, to cause such tool post body to follow, in passing from the working position of one tool to that of the next tool according to the work cycle, an angular path which is the shorter of the two possibilities, namely the path which is spaced by less than 180° from the preceding one.

As is known, the automatic turret tool posts for lathes or similar machines have on their revolving body a series of tools arranged along the periphery of the turret, according to the required size and work capacity.

For example, some revolving turret tool posts are designed with a series of tool posts for inside machining, for example of the retracting type, interspersed with a series of tools for outside or front machining, such as tools for turning, scribing, cutting or the like, on the same revolving body.

The work cycle of the workpiece may be such that it must not follow the order of arrangement of the tools in the turret, but rather follow another succession of machining operations, and therefore the tools suitable for the successive operations may not be located in series about the automatic turret.

To move from one tool to the next, the turrets presently known can follow only one direction of rotation, which causes a considerable increase in idle time when it is necessary to bring into its working position a tool that is located at an angle of more than 180° from the tool that has performed the previous machining operation.

The object of this invention is to eliminate this drawback, enabling the turret tool post to reach the subsequent position, following a given predetermined cycle, always following the path subtending the smaller angle of rotation, regardless of which direction of rotation of the tool post body is required to follow in order to do so.

Thus, according to this invention, if the turret, for example, has twelve tool posts and, in order to follow the work cycle, it is necessary to move from the first to the twelfth tool post arranged on the opposite side in the direction of rotation, the turret with the device according to this invention will have to move by an angle of only 30°, in the opposite direction, instead of a 330° angle as in the automatic turrets of the known type.

This object is achieved according to the invention by providing for a combination of block devices, movable with the body of the tool post and inserted into and retracted from fixed positioning slots by rotary motions to either side, and by providing means to hold said blocks out of their corresponding positioning slots after they have been extracted from them, said devices consisting of an electromagnet and keeper or similar devices, which devices are not effective to hold said blocks as long as they are inside their respective positioning slots.

The block devices are instead kept by said magnet devices out of the slots after having been ejected from them, thus enabling the body of the turret which carries the tools to rotate freely in either direction, in order to cause the next tool post to reach its working position along the shortest possible path.

According to this invention, said magnetic holding devices are composed of an electromagnet or similar device coaxial with the turret, having its pole piece rotating with the tool post body together with an annular keeper which can rotate and traverse axially, fixed to the positioning blocks in the turret and at such a distance from the pole piece, when the blocks are in the slots, that the keeper cannot be attracted by the electromagnet, whereas the keeper is brought closer to the pole piece by said blocks when they are ejected from their respective slots to change position.

The blocks are urged to enter their respective slots by elastic devices, whereas they are ejected from them by inclined planes between the blocks and the slots when the tool post body begins its rotation in one direction to change the position of the tools.

With the device according to this invention, therefore, the result is that, if the body of the turret must reach the new tool post position along the shortest path by rotating in the normal direction, which is considered to be counterclockwise, the positioning may also take place as in the known turrets, without the intervention of the electromagnet; if, however, the new position that must be reached by the tool post requires a rotation in the opposite direction, namely clockwise, which would be impossible with the known turrets, the blocks are kept out of the slots by said electromagnet, which is then excited and attracts the corresponding keeper, already brought to a minimum air gap by the axial traverse to which the block has already been subjected as a result of its end being cammed by the inclined surfaces out of the positioning slot then occupied.

Considerable savings are thus obtained in tool post positioning time, for which there is a limit, fixed by the speed of rotation, which cannot be increased because of the high inertia that the rotating body would have when it stops.

Figure 8:
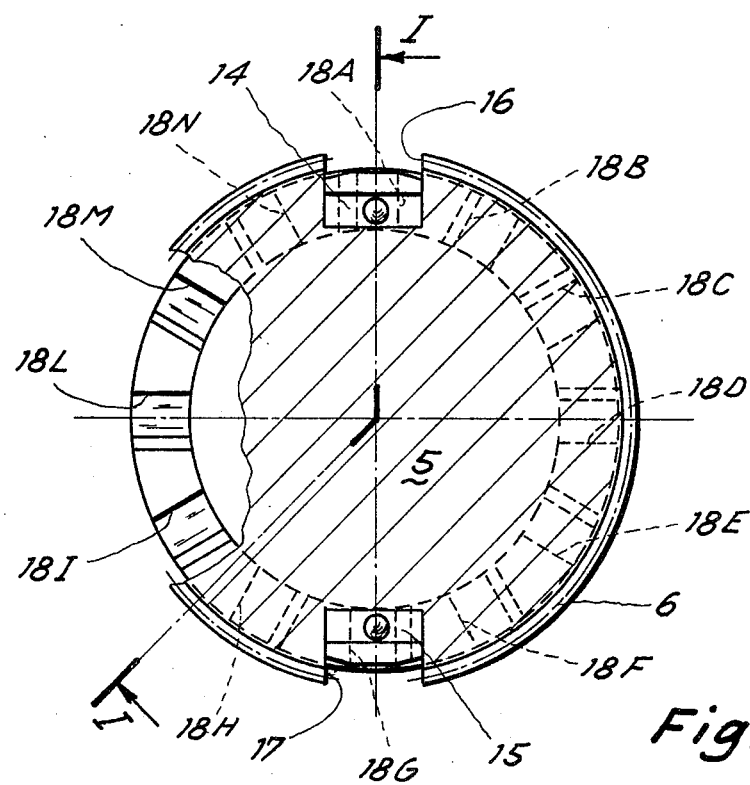

These and other features will appear from the following detailed description of the device according to this invention, shown in an embodiment given as an example in the attached drawings, wherein:

FIG. 1 schematically shows the motor and positioning part of an automatic turret tool post with a horizontal axis, without the tool post body, in a vertical axial section along the line I—I of FIG. 8;

FIGS. 2 through 7 show the details of the positioning devices at various stages of motion, and FIG. 8 shows a cross section along the line VIII—VIII of FIG. 1.

With reference to the drawings, the motor part of a turret tool post with a horizontal axis of the known type is composed of a base 1 having a set of teeth 2 formed on plate 3 fixed to base 1, on which plate is supported a rotary disk 4 having an identical set of teeth 4a, capable of engaging with the set of teeth 2 of base 1.

Rotary disk 4 extends inward with a hub 5 having a screw thread 6 in the form of helical gear teeth that mesh with a nut 7 integral with a worm wheel 8 driven by the worm screw 9, driven in turn by the gears 10, 11 and 12 connected to an electric driving motor 13.

Worm wheel 8 can rotate but cannot move axially inside the base 1, so that, if it is rotated, the rotary disk 4 with the corresponding hub 5 is moved axially as a result of the coupling between nut 7 and screw 6, disk 4 being unable to rotate because of the teeth 2 and 4a when they are engaged with one another.

When the axial traverse of the disk 4 is such that it exceeds the height of the teeth 2 and that of other known devices capable of locking in position the revolving body of the turret (not shown), the screw 6, no longer held against rotation, is also rotated and together with it the disk 4 that is integral with it, until the position required for the tool post to be used in the next machining operation is reached.

Such positioning and locking devices for turret tool posts are already known and used, and therefore such devices need be described herein only to the extent necessary to explain the device of the present invention, which, as explained above, is capable of causing the next tool post to reach its operative position by following the shortest path after the rotary disk has been axially shifted and released from locking by means of the aforementioned usual devices.

According to the invention, for positioning the disk 4, one or more blocks 14, 15 are arranged parallel to the axis of rotation of the disk 4, sliding in axial slots 16, 17 in the hub 5. Each of these blocks is capable of being inserted in suitable positioning slots 18A . . . 18N (in the case of FIG. 8, for example, twelve slots are shown, corresponding to twelve working positions of the respective tool posts), arranged radially and in an annular series coaxial with the hub 5 and facing the blocks 14, 15, which slots are located on said plate 3 integral with the base 1.

As shown in FIGS. 2 through 7, said slots 18 (only slots 18A and 18B are shown in those figures) have one side 18' parallel to the axis and the other 18" sloping, and so are the sides 14' and 14" of the end of the block 14. The positioning of the turret is designed to take place, in a known manner, by contact between the two surfaces 14', 18', whereas the sloping surfaces 18", 14" are used to extract the block from the corresponding slot, pushing it out in the direction of arrow Y (FIG. 3) when the disk rotates in the direction of arrow X (normally counterclockwise for the automatic turrets of the type shown).

Each block 14 is moved toward the slot 18 by springs 19 bearing at their outer ends on members 20 integral with the hub 5 (shown in FIG. 1 but not shown for clarity in FIGS. 2 through 7), whereas hub 5 has protruberances 5a, 5b on opposite sides of each block 14 and with surfaces parallel to the axis of the turret.

Secured to the worm wheel 8 by screws 21 is a driving ring 22 which has, facing each block 14, a rectangular slot 22a whose end surfaces are parallel to the axis and of different lengths, of which the first, 22b, can touch protuberance 5a of hub 5. The second, 22c, is shorter and passes above the block 14 when the latter is inserted in the slot 18.

Rotating together and coaxially with the hub 5 is a ring-shaped keeper 23, connected to each block 14 by means of piston pins 24 that slide axially and are guided through the members 20 that, as previously mentioned, are integral with the hub 5.

In front of the movable keeper 23 there is a magnet assembly composed of a fixed annular coil 25 and a correspondingly shaped annular pole piece 26, which is part of this magnet assembly, but can rotate around the axis of the turret because it is secured to worm wheel 8 by means of the same screws 21 or similar devices, which also lock the driving ring 22 to the wheel 8.

In the position in which the block 14 inserted in the corresponding slot 18, the keeper 23 is at a considerable distance from pole piece 26, and therefore it cannot be attracted by the magnet 25.

In FIGS. 2 through 7, showing the various phases, as specified below, the structure which participates in the positioning of the turret is shown schematically, for clarity of explanation, and superimposed so as to show it all in a single plane.

Figure 2:
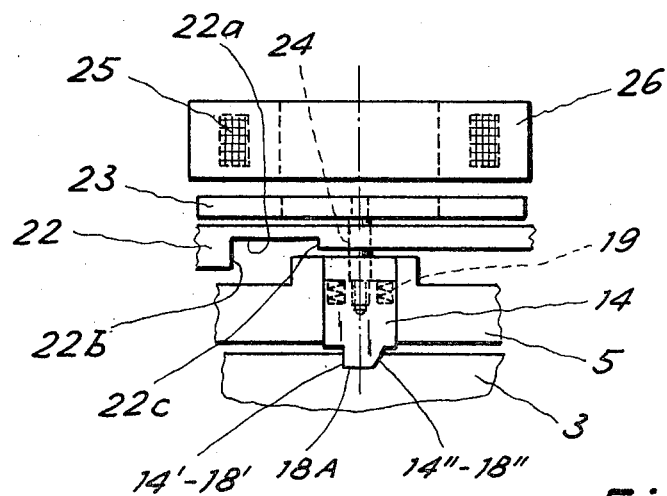

FIG. 2 shows the normal working position in which a tool post is locked in its position, for example 18A, and is performing the corresponding machining operation. As shown, the block 14 is inserted in the slot 18A, whereas the rectangular slot 22a in the ring 22 is outside the block and the surface 22c in slot 22a prevents block 14 from leaving slot 18A by superimposing itself on block 14.

The change of position starts with the traverse, which is normal for the turrets, in the direction of arrow X (counterclockwise) as seen in FIGS. 3 and 4, whereby the worm wheel 8 rotates (and so does the ring 22), causing the disk 4 to traverse axially via the nut 7 by such a distance that the sets of teeth 2 and 4a disengage.

This axial traverse corresponds with the traverse of the slot 22a in the ring 22 from the position shown in FIG. 2 to that shown in FIG. 3, wherein the surface 22a comes into contact with the protuberance 5a on the hub 5.

At this point the hub 5, which is free to rotate, is driven by the disk 22.

The sloping surfaces 18" and 14", in contact with each other, push the block 14 outward in the direction of arrow Y, as seen in FIG. 3, until it leaves slot 18A and moves along the surface of ring 3 (FIG. 4).

The outward movement of block 14 also lifts the keeper 23 until it comes close to the pole piece 26 and, if the magnet 25 is excited, the keeper remains locked to it, further lifting the block 14, as shown in FIG. 5. The assembly of the disk 4, hub 5 and devices integral with them, including the ring 22 and the blocks 14, 15, is then freed for rotary motion and can be moved either counterclockwise in the direction X or in the opposite clockwise direction Z, depending on whether the new position required for the tool is located, along the shorter path, in the same counterclockwise direction X or in the opposite direction Z.

In the first case, the turret behaves in the same manner as the known ones, which therefore is not described, except to point out that in the vicinity of the new position the magnet 25 is de-energized, the keeper 23 is released and the block 14 is moved by the springs 19 to enter the next slot.

In the second case, when the subsequent position is located on the clockwise side Z, for example as shown by 18B (FIGS. 6 and 7), when the block 14 is lifted by the keeper 23 attracted by the magnet 25, the turret motor is driven (by the work cycle) to rotate in direction Z and so does the assembly of the hub 5, so that the driving ring 22 rotates in the direction Z, thus driving, through the contact between the surface 22c of the slot 22 and the outer end of the block 14 ejected from the corresponding slot (as shown in FIG. 6), the assembly composed of said block 14 and the hub 5, until the lower end of the block 14 reaches the vicinity of the new slot 18B (FIG. 7).

At this point, the magnet 25 is de-energized, the keeper 23 is released and the block 14, moved by the spring 19, is pushed in the direction of arrow W toward the slot 18B, which it will gradually enter during the traverse, still in direction Z, of the driving ring 22, until contact is lost between its upper end and the surface 22c in the slot 22.

The driving ring 22 then can continue its traverse in direction Z, whereas, since the hub 5 is now prevented from rotating by the block 14, the screw 6 causes it to traverse in an axial direction, which again causes the set of teeth 4a on the disk 4 to be inserted in the fixed set of teeth 2 on the base 1.

The new working position is thus obtained, as would be shown again in FIG. 2 with slot 18B (instead of 18A), reached by travel through an angle of only 30° instead of the 330° required by the known automatic turrets under the same work cycle conditions.

It is to be understood that many changes, especially with reference to construction, may be made in the embodiment set forth in the above description, so as to adapt the device shown to the various known turrets, without thereby departing from the scope of the present invention.

What is claimed is:

1. A rotary turret comprising a rotatable tool post body having a hub, a plurality of blocks carried by the hub for sliding movement relative to the hub in a direction parallel to the axis of rotation of the hub, a fixed member having slots into which said blocks are selectively insertable, an electromagnet, a keeper juxtaposed to said electromagnet and secured to said blocks, the keeper approaching the electromagnet when the blocks leave the slots and receding from the electromagnet when the blocks enter the slots, means urging the blocks toward the slots, the spacing between the keeper and the electromagnet being such that the electromagnet can retain the keeper against movement away from the electromagnet only when the blocks are out of the slots, and means for rotating the hub in either direction.

2. A turret as claimed in claim 1, said urging means comprising spring means acting between the hub and the blocks to urge the blocks into the slots.

3. A turret as claimed in claim 2, and cam surfaces for urging the blocks out of the slots and the keeper close to the electromagnet, upon rotation of the hub relative to said fixed member in one direction.

4. A turret as claimed in claim 1, said means for rotating the hub comprising a driving ring coaxial with the hub, said driving ring having abutment surfaces thereon that contact the hub in only one direction of rotation of the driving ring, said driving ring having abutment surfaces thereon that contact said blocks only in the other direction of rotation of the driving ring and only when the blocks are withdrawn from the slots.

5. A turret as claimed in claim 1, said keeper being annular and coaxial with the hub.

* * * * *